UNITED STATES PATENT OFFICE.

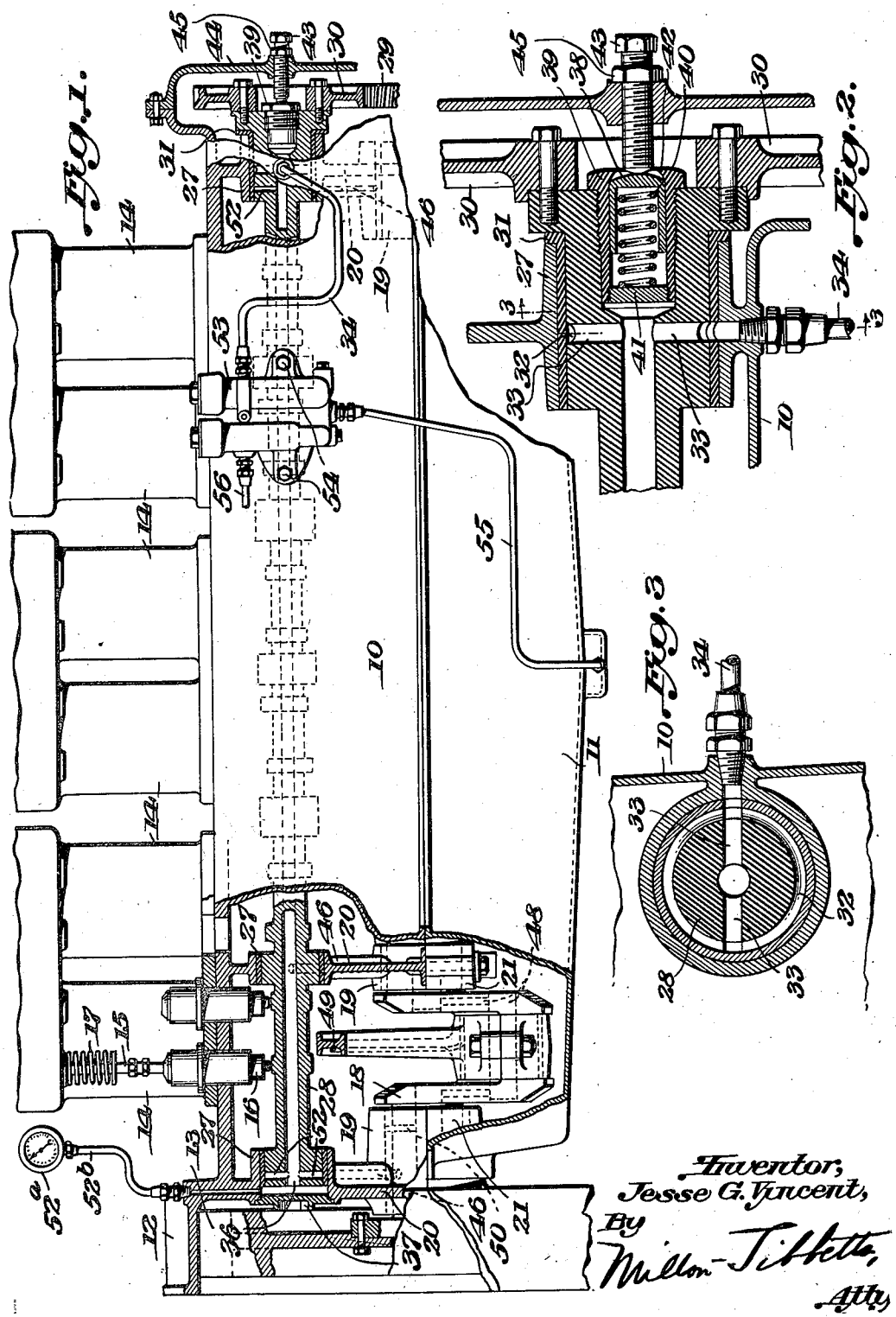

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

1,418,408.  Specification of Letters Patent.  Patented June 6, 1922.

Original application filed October 14, 1912, Serial No. 725,741. Divided and this application filed April 18, 1918. Serial No. 229,428.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This application is a division of my Patent No. 1,265,145, dated May 7, 1918, and it relates to hydrocarbon motors and particularly to means for lubricating the various bearings of the motor.

One of the objects of the invention is to produce a simple oiling system in which most of the pipes or conduits are arranged within the motor itself.

Another object of the invention is to employ the motor valve operating or cam shaft as a conduit and a distributor for the lubricating oil to the various crank shaft and connecting rod bearings.

Another object of the invention is to utilize the oil pressure system against the end of the valve operating shaft to resist the end thrust thereon, due to the valve being driven through helical gears.

Other objects of the invention will appear from the following description taken in connection with the drawings which form a part of this specification, and in which:

Fig. 1 is a side elevation and part longitudinal sectional view of a hydrocarbon motor embodying the invention;

Fig. 2 is an enlarged section of the front end of the valve operating shaft; and Fig. 3 is a transverse section substantially on the line 3—3 of Fig. 2.

Referring to the drawings, 10 indicates the crank case or supporting base of a hydrocarbon motor having a bottom cover 11, and a rearward extension 12, forming a casing for the fly wheel 13. The motor cylinders 14 are shown as cast in pairs and mounted on the crank case, the motor shown comprising six vertical cylinders. One of the valves is shown at 15, operated by the valve lifter 16 and the spring 17.

To the fly wheel 13 is secured the motor crank shaft 18, having in the present instance, seven main bearings 19, which are formed in transverse webs 20 of the crank case 10, the bearings being supported and secured to the webs by bearing blocks 21.

Also mounted in the seven bearings 27 of the webs 20, is a valve operating shaft or cam shaft 28, which extends parallel to the crank shaft and is driven therefrom through helical gears 29—30, thus producing end thrust on cam shaft 28, which may be taken in part by the plain thrust bearing 31.

The cam shaft 28 is shown as drilled throughout its length, thus forming a conduit for the lubricating oil that is supplied by a pump 53. At its forward bearing 27 the shaft 28 has a circumferential groove 32, from which two or more transverse holes 33 lead radially inward to the interior of the shaft. A pipe or conduit 34 leading from the pump 53 supplies oil under pressure through the bearing 27 to the groove 32 and from there through the holes 33 to the interior of the shaft. Thus the hollow shaft is kept constantly full of oil under pressure, and as its rear end 36 is opposed by an abutment 37 the oil pressure within the shaft tends to force the latter forwardly against the end thrust exerted upon it by the gears 29—30. Thus considerable of the end thrust is taken from the plain bearing 31 and the rotating shaft floats in its bearings.

In case of the oil pressure within the cam shaft overcoming the rearward end thrust of the helical gears, the forward end thrust of the shaft may be taken by a spring plunger 38, sliding in a thimble 39, secured in the forward end of the cam shaft. This plunger is backed by a spring 40, secured in the thimble by a removable plug 41, and an internal flange 42 retains the plunger in the thimble until the bolt or abutment 43 in the forward cover 44 is secured in place. This bolt 43 is preferably adjustable, to give the required tension to the spring 40, and is provided with a lock nut 45, as will be seen particularly in Fig. 2. It will be understood that the plunger 38 rotates with a point contact on the end of the bolt 43 with very little friction.

Formed in each of the webs 20 is a diagonally arranged conduit 46 leading from the cam shaft bearing to the corresponding crank shaft bearings. The crank shaft 18 is also drilled out forming conduits 48 leading to the connecting rod bearings and a small pipe or conduit 49 leads from the lower connecting rod bearing to the piston pin bearing (not shown) at the upper end of the rod. Also at its main bearings the crank shaft has radial holes 50 which are adapted to register with the respective conduits 46 so that the oil supplied under pressure to the said conduits 46 will enter the crank shaft main bearings and be distributed to them, and any excess of oil will pass from the interior of the crank shaft to the connecting rod bearings and to the conduits 49. Of course it will be understood that oil will be squeezed out through all of these bearings during the operation of the motor and will be thrust from the various revolving and reciprocating parts and collected at the bottom of the crank case in the sump formed by the bottom cover 11.

It has been shown above how oil is supplied to the interior of the cam shaft 28 under pressure, and upon reference to Figs. 1 and 3 it will be seen that the cam shaft is provided with a radial hole 52 at each of its bearings, these holes being arranged at angles to each other, the present cam shaft having seven bearings, and the holes being preferably arranged equi-distant, so that each of these holes 52 registers during each revolution of the cam shaft with its respective conduit 46 so that oil under pressure is distributed by means of the cam shaft 28 to the various conduits in succession, not more than one conduit being supplied at a given time, thus maintaining the pressure in the distributing cam shaft.

A pressure gauge 52$^a$ is connected by a suitable pipe 52$^b$ with the space between the rear end 36 of the cam shaft and the abutment 37. This gauge gives the pressure at the extreme rear end of the cam shaft so that the minimum pressure within the cam shaft is the pressure registered.

In Fig. 1 the oil pump 53 is shown in elevation as secured to the side of the crank case 10 as by bolts 54. A pipe 55 leads from the bottom of the crank case or sump to the intake side of the pump and the pipe 34 hereinabove described leads from the pump to the forward bearing 27 of the cam shaft where the oil is carried to the interior of the cam shaft by the groove 32 and holes 33. Another pipe 56 leads from the delivery end of the pump to any desired auxiliary system, not shown in the drawings.

Having thus described my invention, what I claim and desire to secure by Letters Patent is:

1. In a motor, the combination with the crank shaft, a valve operating shaft, and driving gears between said shafts creating end thrust on the valve shaft, of an abutment at one end of said shaft, and means for feeding oil under pressure between said abutment and said shaft end to resist said end thrust.

2. In a motor, the combination with the crank shaft, a valve operating shaft, and driving gears between said shafts creating end thrust on the valve shaft, of an abutment at one end of said shaft, means for feeding oil under pressure between said abutment and said shaft end to resist said end thrust, and a spring thrust bearing at the other end of said shaft to take up the excess of thrust over that of the gears.

3. In a motor, in combination with a shaft and a thrust bearing at one end of said shaft, driving means engaging said end of the shaft, force feed lubricating means for said motor, an abutment adjacent the end of the shaft opposite to that at which the thrust bearing is situated and means to admit oil under pressure from said lubricating means to the space between said abutment and the adjacent end of said shaft to thereby resist the end thrust at the other end of said shaft.

4. In a motor, the combination with the valve operating shaft, of an abutment at one end of said shaft, means for feeding oil under pressure between said abutment and said shaft end, and a thrust bearing at the other end of said shaft comprising a plunger in the shaft end, a spring pressing said plunger outwardly, and a stationary bolt in contact with said plunger.

5. In a motor, a rotatable hollow shaft having a recess at its end, means to admit fluid under pressure to the interior of said shaft, a plunger in the recess, a spring pressing said plunger outwardly, and a non-rotating abutment in contact with the center of said plunger.

6. In a hydrocarbon motor, the combination of a hollow rotating shaft, a bearing for said shaft, means for supplying lubricant to the interior of said shaft, said shaft and said bearing constituting a pair of co-operating elements and one of said elements having a radial port and the other having a plurality of radial ports adapted to successively register with the first named radial port as the shaft rotates, and means for leading oil to the port or ports in said bearing.

7. In a hydrocarbon motor, the combination of a hollow rotating shaft, a bearing in which said shaft is mounted, said shaft and bearing being so formed that a circumferential groove is left between the shaft and its bearing, said shaft and said bearing comprising co-operating elements one of which has a radial port and the other of which has a plurality of radial ports adapted to successively register with the first named radial port as the shaft rotates in its bearing, whereby oil may be fed through various ports to the interior of said shaft.

8. In a hydrocarbon motor, the combination of a rotatable hollow shaft, a bearing for said shaft, said bearing having a radial port therein, said shaft having a circumferential groove adapted to constantly register with said ports and having also a radial port leading from said groove to the interior of said shaft, and means for leading oil to the port in said bearing.

In testimony whereof I affix my signature.

JESSE G. VINCENT.